Oct. 9, 1956 W. R. CUSTER 2,765,993
JET PROPELLED AIRCRAFT WITH CHANNEL CONTROL MEANS
Filed March 16, 1955

INVENTOR
WILLARD R. CUSTER

BY
Semmes & Semmes
ATTORNEYS

United States Patent Office 2,765,993
Patented Oct. 9, 1956

2,765,993

JET PROPELLED AIRCRAFT WITH CHANNEL CONTROL MEANS

Willard R. Custer, Hagerstown, Md.

Application March 16, 1955, Serial No. 494,650

6 Claims. (Cl. 244—52)

The present invention relates generally to jet propelled aircraft, and more particularly to aircraft of this type employing a Custer Channel to replace the usual rudder and elevator in such craft. The present invention constitutes a modification and improvement of the devices of my previous Patent No. 2,611,555, September 23, 1952, and my co-pending application Serial No. 436,779, filed June 15, 1954, now Patent No. 2,721,045.

It is well known in the art that tail empennages, and particularly tail fins, rudders, horizontal stabilizers and elevators, not only increase weight of an airplane structure but increase the drag of the aircraft.

It is also known that the Custer Channel construction is susceptible of developing high forces caused by the reaction of air, induced at high velocity, flowing over the active surface of the channel and obtained from the exhaust gases of a jet engine.

It is an object of the present invention to utilize the meritorious features of the Custer Channel construction as a substitute for the usual rudders and elevators of aircraft.

Another object of the present invention is to eliminate either wholly, or in part, the horizontal and vertical stabilizers heretofore used in airplane constructions. In some instances, small stabilizers can be used either for vertical or horizontal stability, or both.

An added object of the present invention is to utilize in a jet aircraft, having a jet tube in the fuselage open at both ends in the direction of flight, a Custer Channel which extends beyond the fuselage at the rear opening of the jet tube, and which is universally mounted by means of a semi-ball and socket joint whereby the channel can be pivoted up, down, or sideways and, in conjunction with the exhaust gases from a jet engine, serve as powerful control means for vertical and horizontal directional control of the aircraft.

A still further object of the present invention is to provide a rear channel in a jet aircraft and which is universally mounted and extends from and behind the fuselage. Control means permit angular adjustment of the extended channel both vertically and sideways. Directional control of the aircraft, in the vertical and horizontal planes, is thereby possible and when combined with standard aileron controls provides all necessary control.

It is additionally an object of the present invention to provide control means as set forth above, wherein a high degree of control is provided at low and critical speeds, since the control means are always in and subject to the path and flow of the exhaust gases from a jet engine contrary to usual practice, wherein at slow speeds, the rudder and elevators are not subjected to high velocity air or gas flow.

Other objects and advantages of the invention will be readily apparent from the following detailed description of embodiments of the invention taken together with the accompanying drawings in which.

Figure 1:
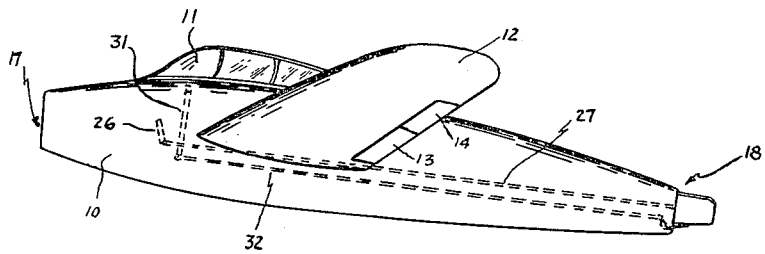
Fig. 1 is a perspective view of an aircraft embodying my invention.

The aircraft of the present invention includes a fuselage 10 having the usual cockpit 11, and wings such as at 12 mounted on opposite sides of the fuselage. The wings are provided with flaps 13, and ailerons 14 of a usual type, and having the usual control means therefor. The ailerons utilized in the present invention are interconnected with the control stick by means, not shown, to permit the usual type of operation for roll control of the aircraft.

The fuselage 10 is provided with a jet tube 15 extending longitudinally through the aircraft in central duct 16. The central duct 16 and jet tube 15 are open at the nose 17 and tail 18 of the fuselage.

The jet engine, not shown, is mounted in jet tube 15. That portion of the jet tube 15 shown in Figs. 2 and 3 constitutes the rearward end of the tube, and through which the exhaust gases from the jet engine are expelled into the atmosphere aft of the tail 18 of the aircraft.

Figure 2:
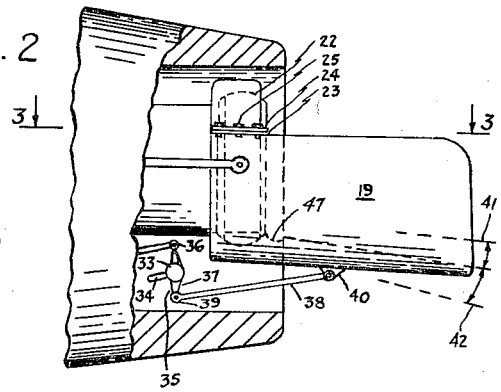
Fig. 2 is a fragmentary view of the Custer control channel as applied to the rearward end of a jet engine exhaust tube.
Figure 3:
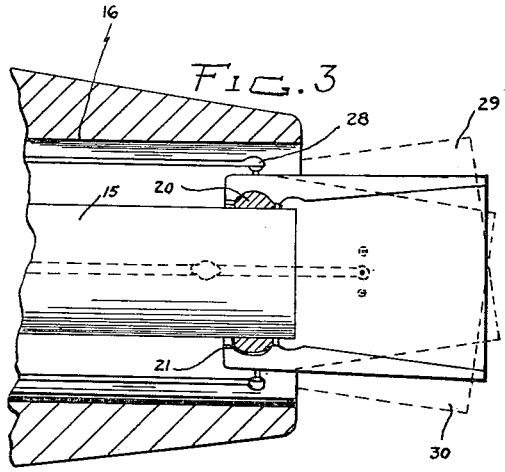
Fig. 3 is a fragmentary sectional view taken on the line 3—3 of Fig. 2.

An upwardly and rearwardly open channel, generally designated 19, is universally mounted on the rearward end of jet tube 15 as shown in detail in Figs. 2 and 3. Channel 19 is of the nature and construction of the usual Custer Channels and preferably is of airfoiled shape in longitudinal cross-section, as set forth in my above-mentioned application and patent. Secured on jet tube 15 is a semi-ball 20, which can be secured to the tube in any known manner. A partial or fragmentary ball socket is formed in the inner surface of the forward edge of the channel, as shown at 21, and is of a shape corresponding with the semi-ball 20 for universal mounting of the channel. The ball socket is completed by means of bracket 22 having a ball socket shape on the interior thereof. The channel is provided with flanges at 23 and the member 22 is provided with mating and coacting flanges at 24.

By means of bolts at 25, the two partial ball sockets 21 and 22 are secured on the semi-ball structure 20 and as will be readily apparent, the channel 19 can be moved upwardly and downwardly, as also sideways due to the universal mounting.

In order to utilize this structure for control of the aircraft, standard rudder pedals such as diagrammatically shown at 26 are used, and from which extend rudder control rods 27, which are secured at their rearward ends to diametrically opposed points on the exterior forward end of channel 19 by means of ball and socket joints generally designated 28. Upon movement of the rudder pedals 26 in the usual manner, the motion will be transmitted through rudder control rods 27 to the universally mounted channel 19, and the channel will be pivoted sideways to the desired extent. The angular limits of travel of the channel 19 are shown in dotted lines in Fig. 3 at 29 and 30, respectively. Because of the large forces which can be generated by means of the channel placed in the direct path of the exhaust gases of the jet engine, the angular extent of travel can be small. This aforementioned structure provides for the horizontal directional control of the aircraft, and replaces the usual type of rudder heretofore utilized. Another benefit derived from this construction is the fact that if desirable, the vertical stabilizing surface can be omitted in view of the high degree and effectiveness of the control provided by the movable channel.

Vertical control of the aircraft for climbing or diving is obtained through control stick 31, shown diagrammatically in Fig. 1, and having the usual control rod 32 secured thereto for fore and aft longitudinal movement upon actuation of the control stick 31. A ball 33 is positioned in, and secured to the wall of the central duct 16, in proximity to the rearward end thereof by means of bolt 34. A double ended socket 35 mates with and coacts with the ball 33. One end 36 of the double ended socket 35 is pivotally connected to the rearward end of control rod 32 from control stick 31. The lower end 37 of the double ended socket 35 is secured to an end of lever 38 by pivot 39. The rearward end of lever 38 is connected to bracket 40 secured to the outer surface of the channel in a pivotal manner. Upon actuation of control stick 31 the motion is transmitted through control rod 32 to lever 38, for movement of channel 19 up or down within defined limits of angular movement as indicated by dotted lines 41 and 42.

The inner surface of channel 19 is provided with a peripheral groove 47 so as to prevent interference with the rear terminal end of jet tube 15. The angular adjustment of channel 19 in the vertical plane results, in a manner similar to that obtained when angularly adjusted in the horizontal plane, to create a controlling or directional force in a vertical direction for the aircraft. Due to the universal mountings and interconnections of the control rods with the channel, freedom of movement in the horizontal and vertical planes is possible.

The ailerons 14 can be controlled from control stick 31 in the usual manner for controlling the roll of the aircraft. It will accordingly be seen that control of the aircraft is provided with respect to the usual three axes of control in a well known manner.

Figure 4:
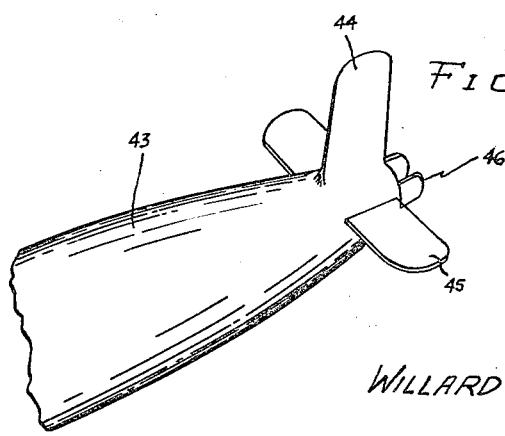
Fig. 4 is a fragmentary perspective view of a modified form of the invention.

While as pointed out above, one of the objects of the present invention is to eliminate horizontal and vertical stabilizing surfaces and controls, so as to reduce weight and drag of the aircraft, there are certain applications or constructions in which either horizontal and/or vertical stabilizing surfaces can be utilized. In Fig. 4 of the drawings, such a modification is shown wherein a fuselage 43 is provided at its rearward end with a small vertical stabilizer 44 and small horizontal stabilizers 45. In accordance with the teachings of the invention these can be much smaller than standard ones. The controllable channel of the present invention, as described with respect to the first embodiment, is generally indicated at 46 and will operate in the same manner.

It will be readily apparent from the foregoing description that the present invention provides a simple and yet highly effective control mechanism for aircraft, particularly adapted for use with jet aircraft, and utilizing the exhaust gases from such a jet engine to implement control forces of a high order.

Manifestly, various changes and minor modifications will appear to those skilled in the art to which the invention pertains, without departing from the spirit and scope of the invention as defined in the appended claims.

I claim:

1. An aircraft comprising a fuselage, wings on said fuselage, a jet tube extending longitudinally through the fuselage and adapted for mounting therein a jet engine, the opposite ends of said fuselage being open, and an upwardly and rearwardly opening channel universally mounted on the external rearward end of said tube and aligned with the discharge of jet exhaust gases from the tube for angular movement in vertical and horizontal planes for directional control of said aircraft.

2. An aircraft as claimed in claim 1, and including control means for vertically and horizontally angularly moving said channel to directionally control said aircraft.

3. An aircraft as claimed in claim 1, means universally mounting said channel comprising a joint of the ball-and-socket type.

4. An aircraft as claimed in claim 3, said socket joint comprising a collar shaped in the form of a spherical segment secured to the rearward end of said jet tube and a correspondingly shaped socket formed at least in part on the forward inner surface of said channel.

5. An aircraft as claimed in claim 4, and wherein a peripheral groove is formed in the inner forward surface of said channel to permit angular movement of said channel without interference with the aft end of said jet tube.

6. In a jet propelled aircraft having a longitudinally extending jet tube therethrough and being open at its opposite ends, a rearward and upward opening channel extending aft of said aircraft aligned with the discharge from the tube, and means universally mounting said channel for vertical and horizontal angular movement for imparting directional control forces to said aircraft when acted upon by jet exhaust gases flowing from said jet tube.

References Cited in the file of this patent

UNITED STATES PATENTS

| | | |
|---|---|---|
| 2,510,561 | De Laval | June 6, 1950 |
| 2,611,555 | Custer | Sept. 23, 1952 |
| 2,665,082 | Anderson | Jan. 4, 1954 |